United States Patent [19]

Mochizuki et al.

[11] 4,350,431

[45] Sep. 21, 1982

[54] PROJECTING DEVICE

[75] Inventors: Noritaka Mochizuki, Yokohama; Setsuo Minami, Kawasaki; Yoshiya Matsui, Yokohama; Atsuo Tsunoda, Fuchu; Koyo Midorikawa, Tokyo; Hidetoshi Murase, Yokohama; Mikio Suzuta; Masazumi Moriwaki, both of Tokyo, all of Japan

[73] Assignee: Canon Kabushiki Kaisha, Tokyo, Japan

[21] Appl. No.: 166,849

[22] Filed: Jul. 8, 1980

[30] Foreign Application Priority Data

Jul. 13, 1979 [JP] Japan .................................. 54/89109
Jul. 13, 1979 [JP] Japan .................................. 54/89110

[51] Int. Cl.$^3$ ....................... G03B 27/00; G03B 27/44
[52] U.S. Cl. ........................................... 355/1; 355/8; 355/46; 355/50
[58] Field of Search ........................... 355/1, 8, 50, 46

[56] References Cited

U.S. PATENT DOCUMENTS

| | | | |
|---|---|---|---|
| 3,560,084 | 2/1971 | Limberger | 355/50 |
| 3,584,950 | 6/1971 | Gundlach | 355/50 |
| 3,619,030 | 11/1971 | Tomii et al. | 355/1 X |
| 4,168,900 | 9/1979 | Adachi | 355/1 |
| 4,173,411 | 11/1979 | Massengeil et al. | 355/50 |

Primary Examiner—Richard A. Wintercorn
Attorney, Agent, or Firm—Fitzpatrick, Cella, Harper & Scinto

[57] ABSTRACT

A projecting device having an array, in a plane perpendicular to the optical axis, of plural element lens systems each axially provided with two bar lenses of an axial length larger than the effective diameter thereof, characterized by the presence of an intermediate ring positioned between two bar lenses for extracting the effective beam emerging from the first bar lens and entering the second bar lens and providing a determined light intensity distribution on the projection plane.

10 Claims, 12 Drawing Figures

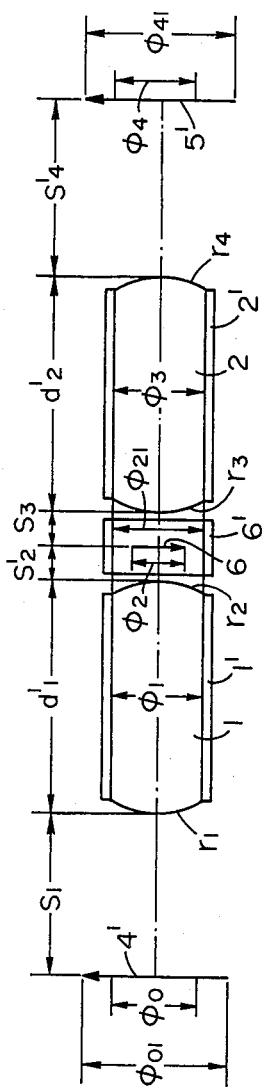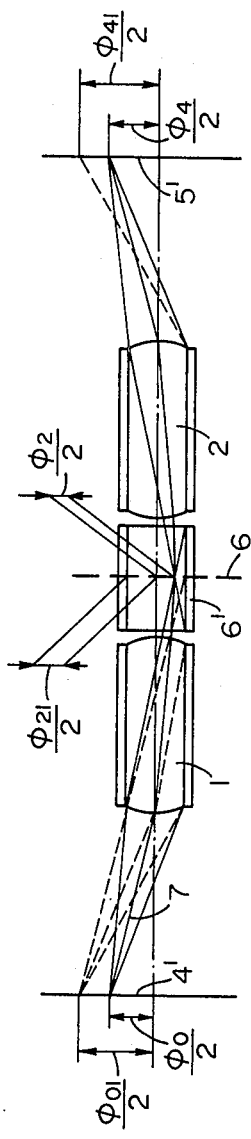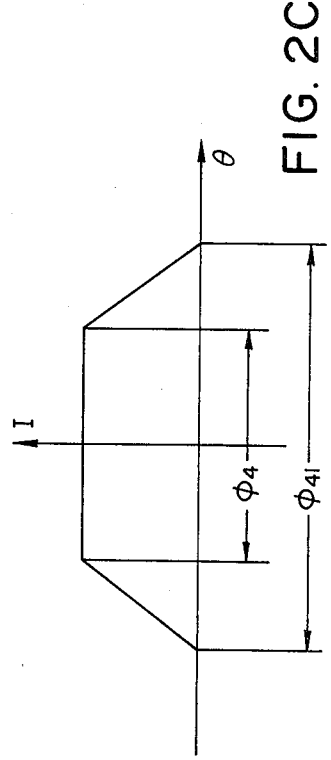
FIG. 2A
FIG. 2B
FIG. 2C

PROJECTING DEVICE

BACKGROUND OF THE INVENTION

1. Field of the Invention

The present invention relates to a projecting device provided with plural bar lenses for projecting the image of an object to a very close distance.

2. Description of the Prior Art

The preceding U.S. patent application Ser. No. 889,404 of the present applicant discloses a projecting device having an array of element lens systems each composed of two bar lenses. Also the preceding U.S. patent application Ser. No. 105,789, now U.S. Pat. No. 4,275,962 issued June 30, 1981, of the present applicant discloses, as light beam controlling means in the element lens system, a beam defining member provided on the external periphery of the bar lenses for attenuating or interrupting the unnecessary beam escaping from the effective diameter area of the bar lenses and also for functioning as the lens tube. In such structure, however, the exact positioning of the bar lenses with respect to the lens supporting members is rendered difficult because of the presence of the light beam defining member between said bar lenses and the lens supporting members. In consideration of the foregoing, the present invention is to facilitate the positioning of elevated precision by direct positioning of bar lenses on the lens supporting members.

SUMMARY OF THE INVENTION

The object of the present invention is to provide a projecting device comprising plural element lens systems each axially composed of two bar lenses, said device being capable of limiting the stray light emerging from the space between two bar lenses and providing a determined light intensity distribution on the projection plane.

The above-mentioned object of the present invention is achieved by arranging, in the U- or V-sectioned grooves of grooved blocks, plural sets each composed of two bar lenses provided on the external periphery thereof with light absorbing portions for limiting the light exceeding the effective diameter thereof and an intermediate ring positioned between said two bar lenses for extracting the effective beam emerging from the first bar lens and entering the second bar lens, thus constituting an array.

BRIEF DESCRIPTION OF THE DRAWINGS

FIGS. 2A, 2B and 2C are explanatory views of the first embodiment of the element lens system, wherein (A), (B) and (C) respectively show the system parameters, beam trajectories and light intensity distribution;

DESCRIPTION OF THE PREFERRED EMBODIMENTS

Figure 1:
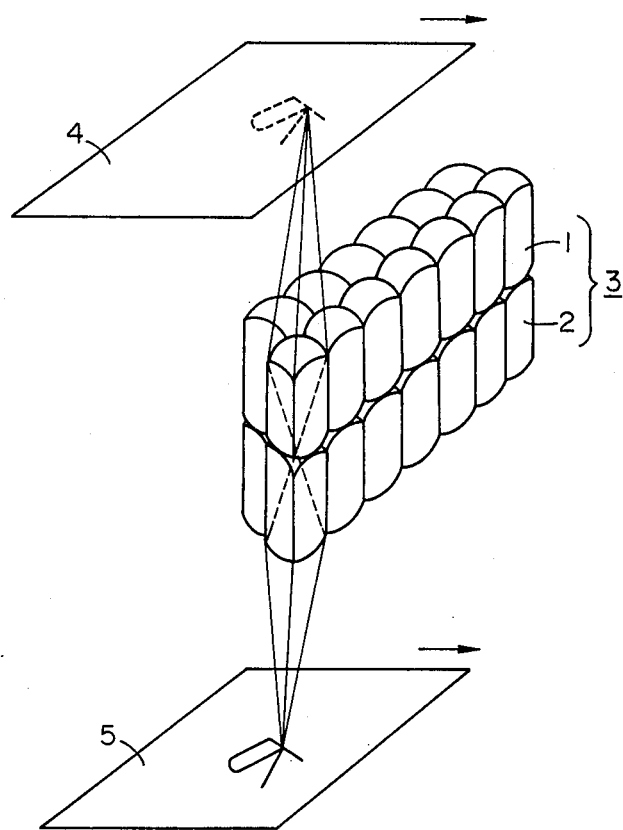
FIG. 1 is a schematic view of a compound bar lens system.

FIG. 1 gives a schematic view of a compound bar lens system, in which the first bar lenses 1 are substantially telecentric at the image field side, while the second bar lenses 2 are substantially telecentric at the object field side. The substantially telecentric lens means a lens capable of providing an incident or emerging principal ray parallel or substantially parallel to the optical axis. The face of the image field side of the first bar lens and the face of the object field side of the second bar lens constitute an air lens to maximize the field lens effect by the telecentric systems. An element lens system 3 is composed of the first bar lens 1 and the second bar lens 2, and each element lens system projects a partial area of the original plane 4 onto a partial area of the photosensitive projection plane 5 as an erect image with a magnification of unity. Such element lens systems are arranged in a direction, for example in the case of a copier utilizing the slit exposure scanning method, along the slit. In such a case it is desirable to arrange plural rows or element lens systems in a staggered fashion in which each row is displaced with respect to the adjacent rows by a half of the pitch of said lens elements, in order to achieve, over the entire slit length, a uniform exposure distribution time integrated in the scanning direction.

FIG. 1 shows the staggered arrangement composed of two rows, in combination with which the original plane 4 and the photosensitive plane 5 are displaced in the direction of the arrows at a determined speed.

Now there will be given an explanation on the optical structure of the element lens system 3, while making reference to FIGS. 2A, 2B and 2C. At first referring to FIG. 2A showing the parameters of the bar lenses, an inverted intermediate image 6 is formed between the first bar lens 1 and the second bar lens 2, 6' is an intermediate ring to be explained later, and 1' and 2' are light absorbing portions provided on the outer periphery of the bar lenses.

Referring to FIG. 2B, the imaging principal ray 7 becomes parallel to the optical axis after emerging from the second face of the first bar lens, and the object 4' is finally forcused as an image 5'. The light intensity I is uniform within a determined area $\phi_4$ as shown in FIG. 2C, then gradually decreases outside said area and becomes equal to zero at the boundary of the area $\phi_{41}$. The abscissa in FIG. 2C indicates the image angle $\theta$. Thus a determined intensity distribution can be obtained on the image plane by arranging the above-explained element lens systems at a determined interval. Now there will be given an explanation on the parameters of the bar lenses.

In FIGS. 2A and 2B it is assumed that the first bar lens 1 is provided with a radius of curvature $r_1$ of the first face at the object field side, a radius of curvature $r_2$ of the second face at the image field side (negative in the illustrated case), an axial thickness $d_1'$ between the first and second faces of said lens, and a principal refractive index $n_1'$ of the lens material for the representative design wavelength. The effective diameter of said lens is represented by $\phi_1$, while the dimension of the object 4' is represented by $\phi_0$, and the dimension of the intermediate image 6 formed by said lens is represented by $\phi_2$. Further the distance from the first face of said lens to the object 4' is represented by $S_1$ (negative in the illustrated case), while the distance from the second face of said lens to the intermediate image 6 is represented by $S_2'$, and the lateral magnification of said intermediate image 6 with respect to the object 4' is represented by $\beta_1(\equiv -|\phi_2/\phi_0|)$. Finally the effective F-number of said lens at the object field is represented by Fe.

The effective F-number is determined from the illuminating condition according to the following equation:

$$Fe = \frac{\sqrt{(S_1)^2 + \left(\frac{\phi_1}{2}\right)^2}}{\phi_1}, \tag{1}$$

the lateral magnification $\beta_1(|\beta_1|<1)$ of the intermediate image to be so determined as to avoid the peripheral loss of the partial image, the distance $S_1$ to the object and the distance $S_2'$ behind the lens to the intermediate image are the parameters that can be determined in advance. Also the principal refractive index $n_1'$ can be determined by the selection of the lens material. These five parameters, Fe, $\beta_1$, $S_1$, $S_2'$ and $n_1'$ are utilized in determining the radius of curvature $r_1$ of the first face of the first bar lens, the radius of curvature $r_2$ thereof, the axial thickness $d_1'$ thereof, the effective diameter $\phi_1$ thereof and the effective partial diameter $\phi_0$ of the object in the following manner according to the ideal imaging theory.

At first the relation between the magnification $\beta_1$ and the lens parameters is given by the following equation:

$$\beta_1 = \frac{1}{\{\psi_1 + \psi_2 - \psi_1 e_1'\psi_2\}S_1 + \{1 - e_1'\psi_2\}} \tag{2}$$

wherein $$\psi_1 \equiv \frac{n_1' - 1}{r_1} \text{ (refractive power of first face)}$$

$$\psi_2 \equiv \frac{1 - n_1'}{r_2} \text{ (refractive power of second face)}$$

$$e_1' \equiv \frac{d_1'}{n_1'}$$

Then the condition that the principal ray 7 of the incident beam from the object, i.e. the ray passing through the center of the first face, becomes parallel to the optical axis after emerging from the second face is represented by the following equation, since this condition is equivalent to the fact that the second focal length $(1/\Psi)$ is equal to $e_1'$:

$$\frac{1}{\psi_2} = e_1' \tag{3}$$

Then in order that the incident beam entering the first bar lens 1 from the brim of the effective object diameter $\phi_0$ is not hindered, there should be satisfied the following equation representing the condition that the lowermost ray of the beam proceeds, after passing the first face of the first bar lens, along the periphery which is parallel to the optical axis:

$$\psi_1 = -\frac{1}{S_1}\left(1 + \frac{\phi_0}{\phi_1}\right) \tag{4}$$

Finally there is required the following relation in order to maintain a suitable distance $S_2'$ from the second face of the first bar lens 1 to the intermediate image position:

$$S_2' = \beta_1 \times \{(1-\Psi_1 e_1')S_1 - e_1'\} \tag{5}$$

The foregoing equations (1)–(5) are solved in combination to obtain the following unitary solutions:

$$r_1 = (n_1' - 1) \times \frac{\beta_1 S_1}{\left[(1-\beta_1) - \frac{S_2'}{\beta_1 S_1}\right]} \tag{6}$$

$$r_2 = (1 - n_1') \times \beta_1 S_1 \tag{7}$$

$$d_1' = n_1' \times \beta_1 S_1 \tag{8}$$

$$\phi_1 = \frac{-S_1/Fe}{\sqrt{1 - \left(\frac{1}{2Fe}\right)^2}} \tag{9}$$

$$\phi_0 = \left(\frac{\left(\frac{S_2'}{\beta_1}\right) - S_2}{\beta_1 S_1}\right) \times \phi_1 \tag{10}$$

Now, an explanation will be given as to the second bar lens 2, making use of the symbols shown in FIG. 2A.

It is assumed that the second bar lens 2 is provided with a radius of curvature $r_3$ of the first face at the object field side, a radius of curvature $r_4$ of the second face at the image field side (negative in the illustrated case), an axial thickness $d_2'$ between the first and second faces, and a principal refractive index $n_2'$ of the lens material for the representative design wavelength. The effective diameter of the lens is represented by $\phi_3$, and the dimension of the projected image on the projection plane with respect to the second bar lens 2 is represented by $\phi_4$. The distance from the first face of said lens to the intermediate image 6 is represented by $S_3$ (negative in the illustrated case), the distance from the second face of the second bar lens 2 to the projected image is represented by $S_4'$, and the lateral magnification of the projected image 5' with respect to the intermediate image 6 is represented by $\beta_2$ ($\equiv -|\phi_4/\phi_2|$). Finally the effective F-number of this lens at the image field side is represented by Fe'.

The effective F-number is determined from the intensity of projected image according to the following equation:

$$Fe' = \frac{\sqrt{(S_4')^2 + \left(\frac{\phi_3}{2}\right)^2}}{\phi_3}, \tag{11}$$

the lateral magnification $\beta_2(|\beta_2|<)$ to be so determined as to avoid the peripheral loss of the partial image, the distance $S_4$ to the intermediate image and the distance $S_4'$ behind the lens to the projection plane are the parameters that can be determined in advance. Also the principal refractive index $n_2'$ can be fixed by the selection of the lens material. These parameters $Fe'$, $\beta_2$, $S_3$, $S_4'$ and $n_2'$ are utilized in determining the radius of curvature $r_3$ of the first face of the second bar lens 2, the radius of curvature $r_4$ of the second face thereof, the axial thickness $d_2'$ thereof, the effective diameter $\phi_3$ thereof and the effective partial diameter $\phi_4$ of the projected image in the following manner according to the ideal imaging theory.

In the first place the relation between the lateral magnification $\beta_2$ and the lens parameters is given by the following equation:

$$\frac{1}{\beta_2} = \frac{1}{\{\psi_3 + \psi_4 - \psi_3 e'_2 \psi_4\}(-S'_4) + \{1 - e'_2 \psi_3\}} \quad (12)$$

wherein $\psi_3 = \frac{n'_2 - 1}{r_3}$ (refractive power of first face)

$\psi_4 = \frac{1 - n'_2}{r_4}$ (refractive power of second face)

$e'_2 = \frac{d'_2}{n'_2}$

Then, in order that the incident beam having the principal ray parallel to the optical axis effectively passes through the effective diameter $\phi_3$ of the second bar lens, the exit pupil is desirably present on the second face of said second bar lens. Consequently the following equation is obtained since this requirement is equivalent to the fact that the focal distance of the first face (i.e. $1/\Psi_3$) is equal to $e_2'$:

$$(1/\Psi_3) = e_2' \quad (13)$$

Then in order that the incident beam entering the second bar lens 2 from the brim of the effective intermediate image diameter $\phi_2$ is not hindered, there should be satisfied the following equation representing the condition that lowermost ray of the beam proceeds, after passing the first face of the second bar lens, along the periphery thereof parallel to the optical axis:

$$\psi_4 = \frac{1}{S'_4}\left(1 + \frac{\phi_4}{\phi_3}\right) \quad (14)$$

Finally there should be satisfied the following equation in order to maintain a suitable distance $S_3$ from the first face of the second bar lens to the intermediate image:

$$S_3 = 1/\beta_2 \times \{(1 - \Psi_4 e_2')S_4' + e_2'S\} \quad (15)$$

The foregoing equations (11)–(15) are solved in combination to obtain the following unitary solutions:

$$r_3 = (1 - n'_2) \times \frac{S'_4}{\beta_2} \quad (16)$$

$$r_4 = (n'_2 - 1) \times \frac{S'_4/\beta_2}{\left[\left(1 - \frac{1}{\beta_2}\right) - \frac{S_3 \times \beta_2}{S'_4}\right]} \quad (17)$$

$$d'_2 = -n'_2 \times S'_4/\beta_2 \quad (18)$$

$$\phi_3 = \frac{S'_4/Fe'}{\sqrt{1 - \left(\frac{1}{2Fe}\right)^2}} \quad (19)$$

$$\phi_4 = \left[\frac{S_2\beta_2 - S'_4}{S'_4/\beta_2}\right] \times \phi_3 \quad (20)$$

Thus, in the element lens system composed of the first bar lens 1 and the second bar lens 2, the first bar lens 1 forms the intermediate image 6 (diameter $\phi_2$) from the object 4' (diameter $\phi_0$), and said intermediate image is relayed by the second bar lens 2 onto the image plane 5' as an erect image of a diameter $\phi_4$, without losing uniformity of intensity. It is to be noted that a condition $\beta_1 \times \beta_2 = +1$, indicating a magnification equal to unity, has to be satisfied in order to form a correct image of the entire object on the projection plane by means of an arrangement of plural element lens systems each composed of the first and second bar lenses. Thus the first and second bar lenses have to be arranged so as to satisfy the following equation:

$$\beta_2 = 1/\beta_1 \quad (21)$$

In such arrangement the equation $Fe' = Fe$ is evidently satisfied.

In summary, in the element lens system composed of the first and second bar lenses for forming an erect image of a magnification equal to unity, the parameters $\beta_2$ and $Fe'$ of the second bar lens 2 are automatically determined if the parameters $\beta_1$ and $Fe$ of the first bar lens are suitably selected. However the other parameters $S_1$, and $S_{2' \text{ and } n_1'}$ of the first bar lens 1 and other parameters $S_3$, $S_4'$ and $n_2'$ of the second bar lens 2 can be determined according to the mutually independent conditions.

The use of different structures in the first and second bar lenses generally requires the preparation of two different bar lenses, which is undesirable from the standpoint of manufacture.

Consequently there is considered a coaxial optical system which is symmetrical with respect to the intermediate image plane, and, in such structure the second lens can be made identical with the first lens. Thus, in such a case, the parameters of the second lens can be defined in the following manner in relation to those of the first lens:

$r_3 = -r_2$, $r_4 = -r_1$, $d_2' = d_1'$, $n_2' = n_1'$, $\phi_3 = \phi_1$, $\phi_4 = \phi_0$, $\beta_2 = 1/\beta_1$, $S_3 = -S_2'$, $S_4'S = -S_1$, $Fe' = Fe$.

In this manner it is rendered possible to simplify the projecting optical system.

In addition the present inventors have experimentally verified that a practically acceptable performance can be obtained even when the first bar lens 1 and the second bar lens 2 are deviated by approximately ±10% from the foregoing conditions (6)–(10) and (16)–(20), i.e. when said lenses satisfy the following relations:

$$K_1 \times (n'_1 - 1) \times \frac{\beta_1 S_1}{[(1 - \beta_1) - \frac{S'_2}{\beta_1 S_1}]} \leq r_1 \leq K_2 \times$$

$$(n'_1 - 1) \times \frac{\beta_1 S_1}{\left[(1 - \beta_1) - \frac{S'_2}{\beta_1 S_1}\right]}$$

$$K_1 \times (1 - n'_1) \times \beta_1 S_1 \geq r_2 \geq K_2 \times (1 - n'_1) \times \beta_1 S_1$$

$$K_1 \times n'_1 \times \beta_1 S_1 \leq d'_1 \leq K_2 \times n'_1 \times \beta_1 S_1$$

$$K_1 \times \frac{(-S_1/Fe)}{\sqrt{1 - \left(\frac{1}{2Fe}\right)^2}} \leq \phi_1 \leq K_2 \times \frac{(-S_1/Fe)}{\sqrt{1 - \left(\frac{1}{2Fe}\right)^2}}$$

$$K_1 \times \left[\frac{\left(\frac{S'_2}{\beta_1}\right) - S_1}{\beta_1 S_1}\right] \times \phi_1 \leq \phi_0 \leq$$

$$K_2 \times \left[\frac{\left(\frac{S'_2}{\beta_1}\right) - S_1}{\beta_1 S_1}\right] \times \phi_1$$

$$K_1 \times (1 - n'_2) \times \frac{S'_4}{\beta_2} \leq r_3 \leq K_2 \times (1 - n'_2) \times \frac{S'_4}{\beta_2}$$

$$K_1 \times (n'_2 - 1) \times \frac{S'_4/\beta_2}{\left[\left(1 - \frac{1}{\beta_2}\right) - \frac{S_3 \times \beta_2}{S'_4}\right]} \geq$$

$$r_4 \geq K_2 \times (n'_2 - 1) \times \frac{S'_4/\beta_2}{\left[\left(1 - \frac{1}{\beta_2}\right) - \frac{S_3 \times \beta_2}{S'_4}\right]}$$

$$n'_2 \times S'_4/\beta_2 \times K_1 \leq d'_2 \leq K_2 \times (-n'_2) \times S'_4/\beta_2$$

$$\frac{S'_4/Fe'}{\sqrt{1 - \left(\frac{1}{2Fe'}\right)^2}} \times K_1 \leq \phi_3 \leq \frac{S'_4/Fe'}{\sqrt{1 - \left(\frac{1}{2Fe'}\right)^2}} \times K_2$$

$$\left[\frac{S_3\beta_2 - S'_4}{S'_4/\beta_2}\right] \times \phi_3 \times K_1 \leq$$

$$\phi_4 \leq \left[\frac{S_3\beta_2 - S'_4}{S'_4/\beta_2}\right] \times \phi_3 \times K_2$$

wherein $K_1 = 0.9$ and $K_2 = 1.1$.

Also a uniformity in the intensity within a fluctuation of several percent can be achieved if the interval $P_1$ of the arrangement of the element lens systems is selected to satisfy the following relation:

$$K_1 S \times (\phi_{01}/2) \leq P_1 \leq K_2 \times \phi_{01}/2 (K_1 = 0.9, K_2 = 1.1)$$

wherein $\phi_{01}$ is the effective object field.

Figure 3:
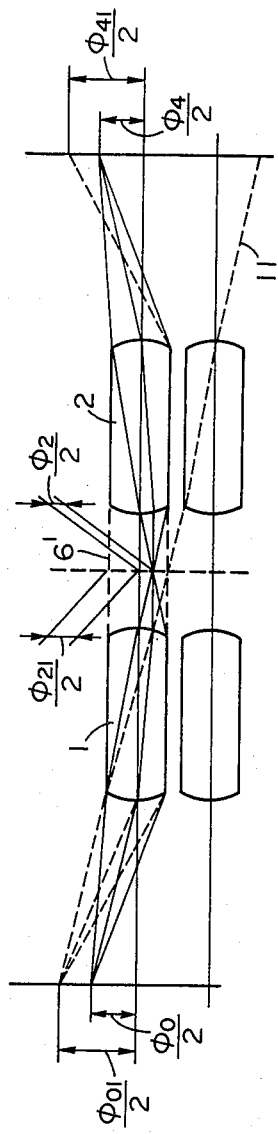
FIG. 3 is an explanatory view showing the function of the intermediate ring.
Figure 5:
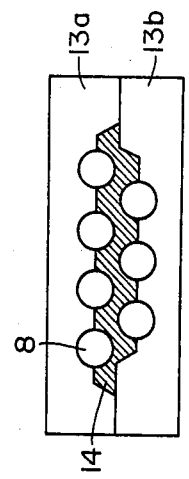
FIG. 5 is a view showing a staggered arrangement of two rows of compound bar lens systems.
Figure 4:
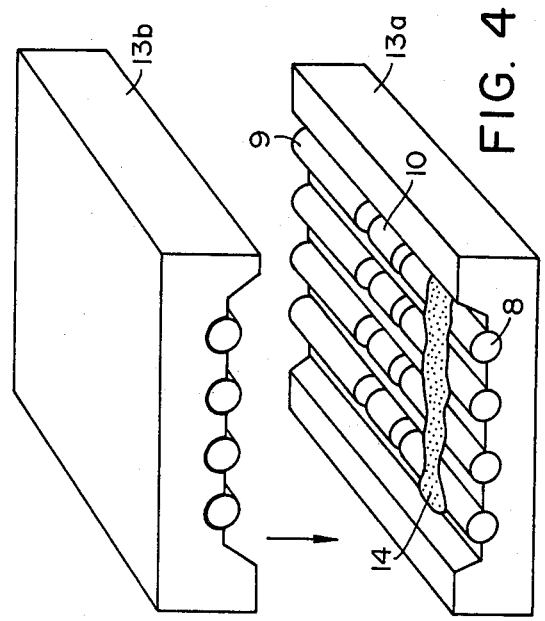
FIG. 4 is a perspective view of an embodiment of the present invention.

Now there will be explained the function of the intermediate ring 6' in relation to FIG. 3. In an element lens system, the beam passing through the first bar lens effectively enters the second bar lens 2 and is transmitted to the image plane. However the undesirable ray 11 which emerges from the first bar lens and enters the second bar lens of another element lens system to reach a point Y' different from the intended focus point forms flare and a ghost image, thus undesirably affecting the obtained image. Thus the intermediate ring 6' is employed to absorb such an unnecessary ray giving rise to such flare or ghost image, thus preventing the arrival of such ray to the image plane. Naturally the intensity of such unnecessary ray is much weaker than that of the principal imaging ray, and the flare formation may be disregarded by the selection of the photosensitive material or by the adjustment of the threshold value. In such case said intermediate ring may be dispensed with. Said intermediate ring 6' is slightly spaced axially from the bar lenses, thereby allowing independent positioning of the bar lenses. The internal wall of the intermediate ring 6' has a diameter equal to or slightly larger than the effective diameter of the bar lenses, and is provided with an anti-reflection treatment such as with a matting paint. FIG. 4 shows the structure of arranging plural element lens systems arranged on grooved blocks 13a having U-sectioned grooves. The element lens systems are easily arranged with a high precision on the U-sectioned grooves. The axial positioning can be achieved by placing the first bar lenses 8 and the second bar lenses 9 in abutting positions with a cylindrical jig temporarily positioned in said grooves, securing said bar lenses in the U-sectioned grooves, then removing said jig and mounting the intermediate rings 10. The U-sectioned grooves of the block 12 may be replaced by V-sectioned grooves. FIG. 5 shows a compound bar lens system seen from the entrance end thereof, in which the grooved blocks 13a, 13b are provided with U-sectioned grooves. The element lens systems are arranged in two rows in a staggered fashion in which each row is displaced with respect to the other by half of the pitch of said element lens systems, in order to achieve uniform distribution, over the entire slit length, of the intensity time integrated in the scanning direction. The space 14 between the element lens systems is filled with a light-shielding material or covered by a mask positioned at the entrance end and provided with apertures corresponding to the effective diameter portions of the element lens systems. Also each bar lens is provided on the external periphery thereof with a light absorbing or diffusing portion to attenuate or annihilate the ray exceeding the effective diameter portion.

Figure 6A:
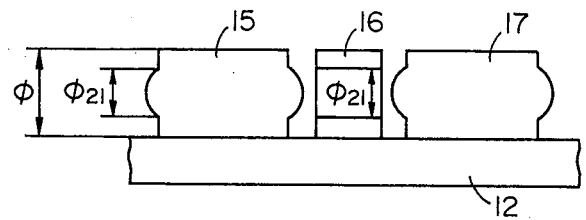
FIGS. 6A and 6B are views showing two embodiments of mounting of the intermediate ring to the grooved blocks.
Figure 6B:
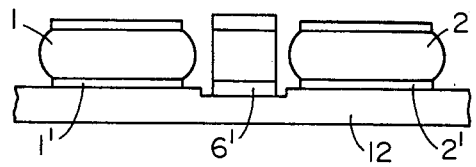

FIGS. 6A and 6B show two embodiments of mounting the intermediate ring into the grooved blocks.

In the embodiment shown in FIG. 6A, the bar lenses have an external diameter $\phi$ larger than the effective diameter $\phi_{21}$ and are provided on both ends thereof with a light diffusing surface such as a coarse surface or a light absorbing surface such as covered with a black paint outside the effective diameter $\phi_{21}$ to intercept the light outside said effective diameter. Also the external periphery of the bar lenses is covered for example with a black paint for absorbing the light. In this manner the light transmitted to the image plane through the first and second bar lenses is limited to that coming through inside said effective diameter $\phi_{21}$. Thus, the ray exceeding the effective diameter $\phi_{21}$ after passing through the first face of the bar lens is annihilated at the external periphery thereof and is not transmitted to the image plane. In this embodiment the internal diameter of the intermediate ring is selected equal to or slightly larger than the effective diameter $\phi_{21}$ of said bar lenses. Because of such structure it is rendered possible to select the external diameter of the intermediate ring identical with that of the bar lenses, whereby said intermediate ring can be provided without excentricity on the grooved blocks for supporting the bar lenses. In another embodiment shown in FIG. 6B the grooved block has a larger groove depth at a portion corresponding to the intermediate ring, whereby it is rendered possible to use an intermediate ring of a diameter different from that of the bar lenses.

Now there will be explained the second embodiment of element lens system shown in FIGS. 7A and 7B.

Figure 7A:
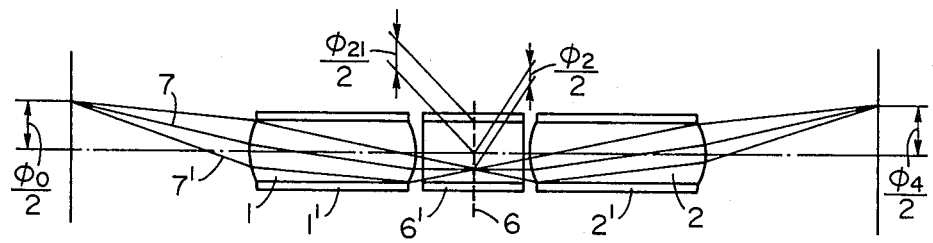
FIGS. 7A and 7B are explanatory views showing a second embodiment of the element lens system, wherein (A) and (B) respectively show the beam trajectory and the light intensity distribution.
Figure 7B:
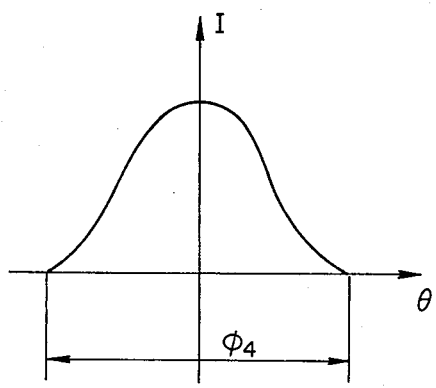

Reference is at first made to FIG. 7A explaining the trajectory of the ray. In this system the principal ray 7 is defined as a ray emerging from the second face of the first bar lens at a certain height and proceeding parallel to the optical axis toward the second bar lens, said height being positioned at the center of the emerging height from the second face of the ray entering the upper end of the first face of the first bar lens 1 from the brim of the effective object field and of the emerging height from the second face of the ray passing through the lower end of the second face of said first bar lens 1.

In the embodiment shown in FIG. 7A, a ray 7' proceeds to the lower end of the second face of the first bar lens, while any other ray located lower than said ray 7' reaches the external periphery of the first bar lens 1 after passing through the first face thereof and is attenuated by the light-absorbing material provided at said periphery. The effective incident beam entering the entrance pupil or the first face of the first bar lens is limited to a part of the lens effective diameter, which is dependent on the image height, whereby the light intensity on the projection plane assumes a Gaussian distribution.

The parameters of the bar lenses are quantitatively explained in the following.

At first the following equation is given from the difinition of the F-number:

$$Fe \equiv \frac{\sqrt{S_1^2 + \left(\frac{\phi_1}{2}\right)^2}}{\phi_1} \quad (1)$$

Also from the paraxial approximation there is given the following reaction:

$$\beta_1 = \frac{1}{(\psi_1 + \psi_2 - \psi_1 e'_2 \psi_2)S_1 + (1 - e'_1 \psi_2)} \quad (2)$$

wherein $\psi_1 \equiv \frac{n'_1 - 1}{r_1}$ (refractive power of first face)

$\psi_2 \equiv \frac{1 - n'_1}{r_2}$ (refractive power of second face)

$e'_1 \equiv \frac{d'_1}{n'_1}$

Then the following equations are given from the condition that the principal ray 7 of the effective incident beam from the object should become parallel to the optical axis after emerging from the second face:

$$\Psi_2 = (2/e_1') \quad (3)$$

$$\Psi_1 = (1/S_1) \quad (4)$$

Also the following relation is required from the condition that the aperture efficiency at the maximum imaging angle becomes equal to zero:

$$\phi_0 = \frac{-2 \times S_1 \times \phi_1}{e'_1} \quad (5)$$

Finally the following equation is required in order to maintain a suitable distance $S_2'$ from the second face of the first bar lens to the intermediate image position:

$$S_2' = (1/\Psi_2) \quad (6)$$

The foregoing conditions (1)–(6) are solved in combination to obtain the following unitary solutions:

$$r_1 = -(n'_1 - 1)S_1 \quad (7)$$

$$r_2 = S_1 \times \beta_1 \times (1 - n'_1) \quad (8)$$

$$d'_1 = 2 \times n'_1 \times S_1 \times \beta_1 \quad (9)$$

$$\phi_1 = \frac{-S_1/Fe}{\sqrt{1 - \left(\frac{1}{2Fe}\right)^2}} \quad (10)$$

$$\phi_0 = -\frac{\phi_1}{\beta_1} \quad (11)$$

With respect to the second bar lens 2, there are at first given the following equations:

$$Fe' \equiv \frac{\sqrt{(S'_4)^2 + \left(\frac{\phi_3}{2}\right)^2}}{\phi_3} \quad (12)$$

$$\frac{1}{\beta_2} = \frac{1}{(\psi_3 + \psi_4 - \psi_3 e'_2 \psi_4)(-S'_4) + (1 - e'_2 \psi_3)} \quad (13)$$

wherein $\psi_3 \equiv \frac{n'_2 - 1}{r_3}$ (refractive power of first face)

$\psi_4 \equiv \frac{1 - n'_2}{r_4}$ (refractive power of second face)

$e'_2 \equiv \frac{d'_2}{n'_2}$

Also the following relations are required in consideration of the condition that the principal ray of the effective incident beam from the object is parallel to the optical axis when entering the first face of the second bar lens:

$$\Psi_3 = (2/e_2') \quad (14)$$

$$\Psi_4 = (1/S_4') \quad (15)$$

Also the following relation is required from the condition that the aperture efficiency is equal to zero at the required maximum imaging angle:

$$\phi_4 = \frac{2 \times S'_4 \times \phi_3}{e'_2} \quad (16)$$

Finally the following relation is required in order to maintain a suitable distance $S_3$ from the first face of the second bar lens to the intermediate image position:

$$S_3 = -1/\Psi_3 \quad (17)$$

The foregoing equations (12)–(17) are solved in combination to obtain the following unitary solutions:

$$r_3 = S'_4 \times \frac{1}{\beta_2} \times (1 - n'_2) \tag{18}$$

$$r_4 = (1 - n'_2) \times S'_4 \tag{19}$$

$$d'_2 = -2 \times n'_2 \times S'_4 \times \frac{1}{\beta_2} \tag{20}$$

$$\phi_3 = \frac{S'_4/Fe'}{\sqrt{1 - \left(\frac{1}{2Fe'}\right)^2}} \tag{21}$$

$$\phi_4 = -\beta_2 \times \phi_3 \tag{22}$$

In addition the condition that the magnification should be equal to unity provides:

$$\beta_2 = 1/\beta_1 \tag{23}$$

$$Fe' = Fe \tag{24}$$

Furthermore the following conditions are added in case the element lens system has a symmetrical structure:

$r_3 = -r_2, r_4 = -r_1, d_2' = d_1', n_2' = n_1', \phi_3 = \phi_1, \phi_4 = \phi_0,$
$\beta_2 = 1/\beta_1, S_3 = -S_2', S_4' = -S_1$ and $Fe' = Fe$.

Similarly to the foregoing first embodiment, the present inventors have experimentally confirmed that the bar lenses may be deviated by approximately ±10% from the conditions defined by the foregoing relations (7)–(11) and (18)–(22). Also a uniformity in the light intensity within a fluctuation of several percent can be assured if the pitch P of the arrangement of the element lens systems is selected to satisfy the following relation:

$$N_1 \times \phi_1 < P < N_2 \times \phi_1$$

wherein $N_1 = 1.18$ and $N_2 = 1.36$.

Figure 8:
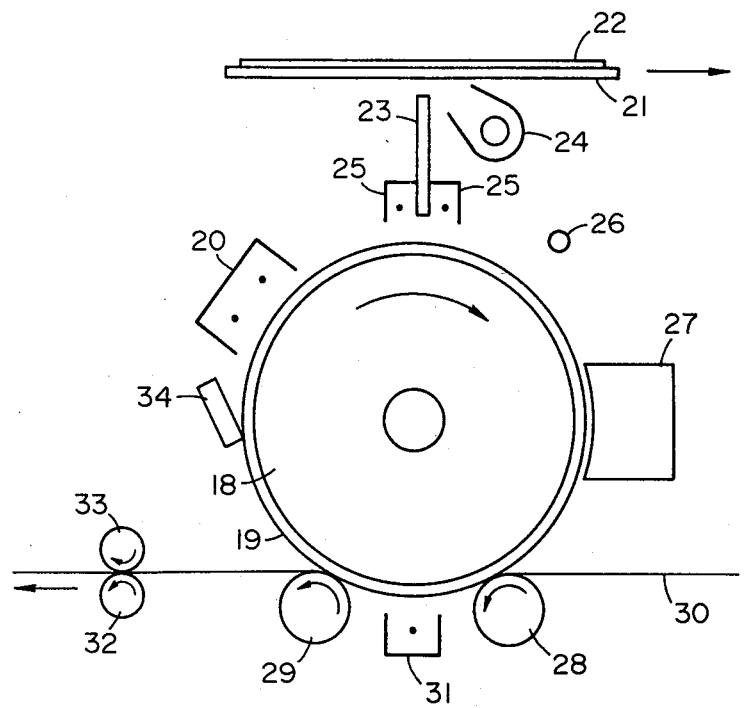
FIG. 8 is a schematic view of a copier in which the present invention is applied.

In the following is explained the process in a copier in which the present invention is applied, as shown in FIG. 8.

Referring to FIG. 8, a drum 18 rotated at a constant speed in the direction of the arrow by an unrepresented motor is provided on the periphery thereof with a photosensitive member 19 composed in succession of a conductive substrate, a photoconductive layer and a surfacial transparent insulating layer, which is at first subjected to uniform charging with a corona discharger 20, said charging being positive or negative respectively when said photoconductor is composed of an N-type or P-type semiconductor. Subsequently said photosensitive member 19 is exposed to the image of an original 22 placed on a transparent original carriage 21 displaced in synchronization with the rotation of said drum 18 at a speed equal to the peripheral speed of said drum 18 multiplied by the reciprocal of the imaging magnification (same speed in the case of a magnification of unity), and said image being focused onto said photosensitive member 19 by means of a projecting device 23. The area of said original 23 facing the projecting device 23 for imaging on the photosensitive member 19 is illuminated with an illuminating system 24 composed of a lamp and a reflector. Thus the amount of exposure to the photosensitive member 19 can be regulated for example by changing the amount of illumination.

Simultaneous with the imagewise exposure by said projecting device 23, the photosensitive member 19 is subjected to charge elimination by an AC corona discharger 25 or a DC corona discharger of a polarity opposite to that of the corona discharger 20, whereby a charge pattern corresponding to the image of the original 22 is formed on said photosensitive member 19. Said photosensitive member 19 is further subjected to whole surface exposure by a lamp 26 to obtain an electrostatic latent image of an enhanced contrast. The latent image thus formed is developed into a visible toner image by means of a developing station 27 utilizing cascade or magnet brush development. Subsequently said toner image is transferred onto a transfer sheet supplied from unrepresented supply means and maintained in contact with and advanced at the same speed with the photosensitive member 19 by means of rollers 28, 29. In order to improve the transfer efficiency a corona discharger 31 provides a charge of a polarity opposite to that of the toner constituting the toner image to the rear side of the transfer sheet in the transfer position. The transfer sheet bearing said transferred toner image is subjected to a fixing step in a suitable fixing station such as a thermal fixing station provided with a pair of rollers 32, 33 maintained in pressure contact with said transfer sheet, and is further transported to unrepresented storage means.

The photosensitive member after said image transfer is subjected to a cleaning step with an elastic blade 34 maintained in contact with said photosensitive member for removing the toner remaining thereon, and is readied for re-use in the above-explained imaging cycle. In the foregoing explanation the corona discharger 25 is positioned so as to effect the charge elimination simultaneously with the imagewise exposure, but it may also be positioned between the charger 20 and the imaging system for effecting the charge elimination of the surface of said photosensitive member prior to said imagewise exposure. In such case the lamp 26 can be eliminated. Also the photosensitive member 19 can be of a type not having the surfacial insulating layer, in which case said corona discharger 25 and the lamp 26 may be dispensed with.

As explained in the foregoing, the present invention provided a compact projecting device showing satisfactory optical performance and allowing easy positioning of the optical elements on the lens support members with an elevated accuracy.

What we claim is:

1. A projecting device, comprising:
   a plurality of element lens systems each adapted for imaging a part of an object as part of a corresponding projected image and each comprising two bar lenses having axial lengths larger than the effective diameter thereof;
   a light absorbing portion provided on the external periphery of each bar lens and adapted for limiting light rays exceeding the effective diameter thereof;
   an intermediate ring provided between said two bar lenses in each element lens system for extracting the effective light beam; and
   support members for arranging said plural element lens systems along grooves provided in said support member to form an array of said systems;
   wherein a first of said bar lenses satisfies the following conditions:

$$K_1 \times (n'_1 - 1) \times \frac{\beta_1 S_1}{(1 - \beta_1) - \frac{S_2}{\beta_1 S_1}} \leq r_1 \leq K_2 \times (n'_1 - 1) \times$$

-continued $$\frac{\beta_1 S_1}{(1-\beta_1) - \frac{S_2}{\beta_1 S_1}};$$

$$K_2 \times (1 - n'_1) \times \beta_1 S_1 \leq r_2 \leq K_1 \times (1 - n'_1) \times \beta_1 S_1;$$

$$K_1 \times n'_1 \times \beta_1 S_1 \leq d'_1 \leq K_2 \times n'_1 \times \beta_1 S_1;$$

$$K_1 \times \frac{-S_1/Fe}{1 - \left(\frac{1}{2Fe}\right)^2} \leq \phi_1 \leq K_2 \times \frac{-S_1/Fe}{1 - \left(\frac{1}{2Fe}\right)^2}; \text{ and}$$

$$K_1 \times \frac{\frac{S'_2}{\beta_1} - S_1}{\beta_1 S_1} \times \phi_1 \leq \phi_0 \leq K_2 \times \frac{\frac{S'_2}{\beta_1} - S_1}{\beta_1 S_1} \times \phi_1;$$

wherein:
$r_1$ is the radius of curvature of the first face of said first bar lens;
$r_2$ is the radius of curvatuve of the second face thereof;
$d_1'$ is the axial lens thickness between the first and second faces of said first bar lens;
$\phi_1$ is the effective diameter thereof;
$\phi_0$ is the dimension of the object;
$n_1'$ is the refractive index of the material of said first bar lens for the design wavelength;
$\beta_1$ is the lateral magnification of said first bar lens;
$S_1$ is the axial distance from the first face of said first bar lens to the object plane;
$S_2'$ is the axial distance from the second face of said first bar lens to the intermediate image plane;
Fe is the effective F-number at the object field side;
$K_1$ is 0.9 and
$K_2$ is 1.1; and
wherein the second bar lens satisfies the following conditions:

$$K_1 \times (1 - n'_2) \times \frac{S'_4}{\beta_2} \leq r_3 \leq K_2 \times (1 - n'_2) \times \frac{S'_4}{\beta_2};$$

$$K_2 \times (n'_2 - 1) \times \frac{S'_4/\beta_2}{\left(1 - \frac{1}{\beta_2}\right) - \frac{S_3 \times \beta_2}{S'_4}} \leq r_4 \leq K_1 \times$$

$$(n'_2 - 1) \times \frac{S'_4/\beta_2}{\left(1 - \frac{1}{\beta_2}\right) - \frac{S_3 \times \beta_2}{S'_4}};$$

$$-K_1 \times n'_2 \times S'_4/\beta_2 \leq d'_2 \leq -K_2 \times n'_2 \times S'_4/\beta_2;$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}};$$

and $$K_1 \times \phi_3 \times \frac{S_3 \beta_2 - S'_4}{S'_4/\beta_2} \leq \phi_4 \leq K_2 \times \phi_3 \times \frac{S_3 \beta_2 - S'_4}{S'_4/\beta_2};$$

wherein:
$r_3$ is the radius of curvature of the first face of said second bar lens;
$r_4$ is the radius of curvature of the second face thereof;

$d_2'$ is the axial lens thickness between the first and second faces of said second bar lens;
$\phi_3$ is the effective diameter of said second bar lens;
$\phi_4$ is the dimension of the projected image;
$n_2'$ is the refractive index of the material of said second bar lens for the design wavelength;
$\beta_2$ is the lateral magnification of said second bar lens;
$S_2$ is the axial distance from the first face of said second bar lens to the intermediate image plane;
$S_4'$ is the axial distance from the second face of said second bar lens to the projection plane;
Fe' is the effective F-number at the image field side;
$K_1$ is 0.9, and
$K_2$ is 1.1

2. A projecting device according to the claim 1, further satisfying the conditions $r_3 = -r_2$, $r_4 = -r_1$, $d_2' = d_1'$, $n_2' = n_1'$, $\phi_3 = \phi_1$, $\phi_4 = \phi_0$, $\beta_2 = 1/\beta_1$, $S_3 = -S_2'$, $S_4' = -S_1$ and $Fe' = Fe$.

3. A projecting device, comprising:
a plurality of element lens systems each adapted for imaging a part of an object as part of a corresponding projected image and each comprising two bar lenses having axial lengths larger than the effective diameter thereof;
a light absorbing portion provided on the external periphery of each bar lens and adapted for limiting light rays exceeding the effective diameter thereof;
an intermediate ring provided between said two bar lenses in each element lens system for extracting the effective light beam; and
support members for arranging said plural element lens systems along grooves provided in said support member to form an array of said systems;
wherein a first of said bar lenses satifies the following conditions:

$$-K_1 \times S_1 \times (n'_1 - 1) \leq r_1 \leq -K_2 \times S_1 \times (n'_1 - 1);$$

$$K_2 \times S_1 \times \beta_1 \times (1 - n'_1) \leq r_2 \leq K_1 \times S_1 \times \beta_1 \times (1 - n'_1);$$

$$2 \times K_1 \times n'_1 \times S_1 \times \beta_1 \leq d'_1 \leq 2 \times K_2 \times n'_1 \times S_1 \times \beta_1;$$

$$K_1 \times \frac{-S_1/Fe}{\sqrt{1 - \left(\frac{1}{2Fe}\right)^2}} \leq \phi_1 \leq K_2 \times$$

$$\frac{-S_1/Fe}{\sqrt{1 - \left(\frac{1}{2Fe}\right)^2}}; \text{ and } -K_1 \times \frac{\phi_1}{\beta_1} \leq \phi_0 \leq -K_2 \times \frac{\phi_1}{\beta_1};$$

wherein:
$r_1$ is the radius of curvature of the first face of said first bar lens;
$r_2$ is the radius of curvature of the second face thereof;
$d_1'$ is the axial lens thickness between the first and second faces of said first bar lens;
$\phi_1$ is the effective diameter thereof;
$\phi_0$ is the dimension of the object;
$n_1'$ is the refractive index of the material of said first bar lens for the design wavelength;
$\beta_1$ is the lateral magnification of said first bar lens;
$S_1$ is the axial distance from the first face of said first bar lens to the object plane;
$S_2'$ is the axial distance from the second face of said first bar lens to the intermediate image plane;

Fe is the effective F-number at the object field side; and $K_1$ is 0.9 and $K_2$ is 1.1; and wherein said second bar lens satisfies the following conditions;

$$K_1 \times S'_4 \times \frac{1}{\beta_2} \times (1 - n'_2) \leq r_3 \leq K_2 \times S'_4 \times \frac{1}{\beta_2} \times (1 - n'_2);$$

$$K_2 \times S'_4 \times (1 - n'_2) \leq r_4 \leq K_1 \times S'_4 \times (1 - n'_2);$$

$$-2 \times K_1 \times n'_2 \times S'_4 \times \frac{1}{\beta_2} \leq d'_2 \leq -2 \times K_2 \times n'_2 \times S'_4 \times \frac{1}{\beta_2};$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}}; \text{ and}$$

$$-K_1 \times \beta_2 \times \phi_3 \leq \phi_4 \leq -K_2 \times \beta_2 \times \phi_3;$$

wherein:

$r_3$ is the radius of curvature of the first face of said second bar lens;

$r_4$ is the radius of curvature of the second face thereof;

$d_2'$ is the axial lens thickness between the first and second faces of said second bar lens;

$\phi_3$ is the effective diameter of said second bar lens;

$\phi_4$ is the dimension of the projected image;

$n_2'$ is the refractive index of the material of said second bar lens for the design wavelength;

$\beta_2$ is the lateral magnification of said second bar lens;

$S_3$ is the axial distance from the first face of said second bar lens to the intermediate image plane;

$S_4'$ is the axial distance from the second face of said second bar lens to the projection plane; and Fe' is the effective F-number at the image field side.

4. A projecting device according to the claim 3, further satisfying the following conditions:

$r_3 = -r_2$, $r_4 = -r_1$, $d_2' = d_1'$, $n_2' = n_1'$, $\phi_3 = \phi_1$, $\phi_4 = \phi_0$, $\beta_2 = 1/\beta_1$, $S_3 = -S_2'$, $S_4' = -S_1$, Fe' = Fe.

5. A projecting device according to claim 1, wherein said element lens systems are arranged, when viewed from the entrance ends thereof, in two rows and in a staggered fashion in which each row is displaced with respect to the other row by a distance equal to half the pitch of said systems.

6. A projecting device according to claim 1, wherein said support member is a grooved block having U-sectioned grooves.

7. A projecting device according to claim 1, wherein said support member is a grooved block having V-sectioned grooves.

8. A projecting device according to claim 3, wherein said element lens systems are arranged, when viewed from the entrance ends thereof, in two rows and in a staggered fashion in which each row is displaced with respect to the other row by a distance equal to half the pitch of said systems.

9. A projecting device, comprising:

a plurality of element lens systems each adapted for imaging a part of an object as part of a corresponding projected image and each comprising two bar lenses having axial lengths larger than the effective diameter thereof;

a light absorbing portion provided on the external periphery of each bar lens and adapted for limiting light rays exceeding the effective diameter thereof;

an intermediate ring provided between said two bar lenses in each element lens system for extracting the effective light beam; and support members for arranging said plural element lens systems along grooves provided in said support member to form an array of said systems;

wherein a first of said bar lenses satisfies the following conditions:

$$K_1 \times (n'_1 - 1) \times \frac{\beta_1 S_1}{(1 - \beta_1) - \left[\frac{S_2}{\beta_1 S_1}\right] \frac{S'_2}{\beta_1 S_1}} \leq$$

$$r_1 \leq K_2 \times (n'_1 - 1) \times \frac{\beta_1 S_1}{(1 - \beta_1) - \left[\frac{S_2}{\beta_1 S_1}\right] \frac{S'_2}{\beta_1 S_1}};$$

$$K_2 \times (1 - n'_1) \times \beta_1 S_1 \leq r_2 \leq K_1 \times (1 - n'_1) \times \beta_1 S_1;$$

$$K_1 \times n'_1 \times \beta_1 S_1 \leq d'_1 \leq K_2 \times n'_1 \times \beta_1 S_1;$$

$$K_1 \times \left[\frac{-S_1/Fe}{1 - \left(\frac{1}{2Fe}\right)^2}\right] \frac{S_1/Fe}{\sqrt{1 - \left(\frac{1}{2Fe}\right)^2}} \leq$$

$$\phi_1 \leq K_2 \times \left[\frac{-S_1/Fe}{1 - \left(\frac{1}{2Fe}\right)^2}\right] \frac{-S_1/Fe}{\sqrt{1 - \left(\frac{1}{2Fe}\right)^2}}; \text{ and}$$

$$K_1 \times \frac{\frac{S'_2}{\beta_1} - S_1}{\beta_1 S_1} \times \phi_1 \leq \phi_0 \leq K_2 \times \frac{\frac{S'_2}{\beta_1} - S_1}{\beta_1 S_1} \times \phi_1;$$

wherein:

$r_1$ is the radius of curvature of the first face of said first bar lens;

$r_2$ is the radius of curvature of the second face thereof;

$d_1'$ is the axial lens thickness between the first and second faces of said first bar lens;

$\phi_1$ is the effective diameter thereof;

$\phi_0$ is the dimension of the object;

$n_1'$ is the refractive index of the material of said first bar lens for the design wavelength;

$\beta_1$ is the lateral magnification of said first bar lens;

$S_1$ is the axial distance from the first face of said first bar lens to the object plane;

$S_2'$ is the axial distance from the second face of said first bar lens to the intermediate image plane;

Fe is the effective F-number at the object field side;

$K_1$ is 0.9 and $K_2$ is 1.1; and wherein the second bar lens satisfies the following conditions:

$$K_1 \times (1 - n'_2) \times \frac{S'_4}{\beta_2} \leq r_3 \leq K_2 \times (1 - n'_2) \times \frac{S'_4}{\beta_2};$$

-continued $$K_2 \times (n'_2 - 1) \times \frac{S'_4/\beta_2}{\left(1 - \frac{1}{\beta_2}\right) - \frac{S_3 \times \beta_2}{S'_4}} \leq r_4 \leq K_1 \times$$

$$(n'_2 - 1) \times \frac{S'_4/\beta_2}{\left(1 - \frac{1}{\beta_2}\right) - \frac{S_3 \times \beta_2}{S'_4}};$$

$$-K_1 \times n'_2 \times S'_4/\beta_2 \leq d'_2 \leq -K_2 \times n'_2 \times S'_4/\beta_2;$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}};$$

and $$K_1 \times \phi_3 \times \frac{S_3 \beta_2 - S'_4}{S'_4/\beta_2} \leq \phi_4 \leq K_2 \times \phi_3 \times \frac{S_3 \beta_2 - S'_4}{S'_4/\beta_2};$$

wherein:
$r_3$ is the radius of curvature of the first face of said second bar lens;
$r_4$ is the radius of curvature of the second face thereof;
$d_2'$ is the axial lens thickness between the first and second faces of said second bar lens;
$\phi_3$ is the effective diameter of said second bar lens;
$\phi_4$ is the dimension of the projected image;
$n_2'$ is the refractive index of the material of said second bar lens for the design wavelength;
$\beta_2$ is the lateral magnification of said second bar lens;
$S_2$ is the axial distance from the first face of said second bar lens to the intermediate image plane;
$S_4'$ is the axial distance from the second face of said second bar lens to the projection plane;
$Fe'$ is the effective F-number at the image field side;
$K_1$ is 0.9, and
$K_2$ is 1.1.

10. A projecting device according to claim 3, wherein said support member is a grooved block having V-sectioned grooves.

* * * * *